UNITED STATES PATENT OFFICE.

MELVIN B. CHURCH, OF GRAND RAPIDS, ASSIGNOR TO HIMSELF AND GEORGE EASTMAN, OF EASTMANVILLE, MICHIGAN.

IMPROVEMENT IN CALCIMINE.

Specification forming part of Letters Patent No. 161,591, dated April 6, 1875; application filed May 22, 1874.

*To all whom it may concern:*

Be it known that I, MELVIN B. CHURCH, of Grand Rapids, in the county of Kent and State of Michigan, have invented an Improved Calcimine for Walls and Ceilings, the formula for preparing which is given in the following specification:

I take of pulverized calcined gypsum nine pounds, and of white glue one pound, the glue having been previously dissolved in hot water. When this glue, thus dissolved, is cold, I stir it into the gypsum in any suitable vessel, adding thereto, from time to time, sufficient cold water, until the mixture has the consistency of mixed paint for priming-coats, when it may be laid on the wall with a brush, where it sets slowly, affording a hard, dead-smooth surface that will not rub off, and is much cheaper than the calcimine which has whiting or zinc for the body.

The effect or result of the mixture of the glue with the gypsum in the manner described is to delay the action of the gypsum in taking up and uniting chemically with the water, so that the material compounded does not "set" for a considerable time, and this may be used as a paint with ordinary brushes. It may be tinted, as desired, and can be brushed on over papered walls whose paper has become faded, dingy, or smoked, making a plain tint on the paper, and covering or obliterating the colors in the paper.

One coat of this calcimine is better, has more body, and is whiter than two coats of whiting calcimine. Mixed to a thicker consistency, it makes a very cheap and quick-setting putty for setting glass in sash.

This calcimine makes a good and durable paint for wood, brick, stone, and metal, and sets well on paint.

I am aware that glue has been used in compounds made of various chalks, and has been used in compounds made of ordinary lime, and I do not claim to have invented any such compounds; but

What I claim as my invention, and desire to secure by Letters Patent, is—

A calcimining compound adapted to be used with brushes, composed of pulverized calcined gypsum, dissolved glue, and cold water, substantially as described.

MELVIN B. CHURCH.

Witnesses:
 H. F. EBERTS,
 H. S. SPRAGUE.